United States Patent
England et al.

(10) Patent No.: US 6,651,171 B1
(45) Date of Patent: Nov. 18, 2003

(54) SECURE EXECUTION OF PROGRAM CODE

(75) Inventors: Paul England, Bellevue, WA (US); Butler W. Lampson, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/287,393

(22) Filed: Apr. 6, 1999

(51) Int. Cl.⁷ .................... G06F 12/08; G06F 12/14
(52) U.S. Cl. .................... 713/193; 713/194; 711/163; 711/164
(58) Field of Search ................. 713/189, 193, 713/194; 711/152, 153, 163, 164, 203, 206; 710/36, 107, 262; 707/9

(56) References Cited

U.S. PATENT DOCUMENTS

| | | | |
|---|---|---|---|
| 5,335,334 A | * 8/1994 | Takahashi et al. | 711/164 |
| 5,491,827 A | * 2/1996 | Holtey | 711/163 |
| 5,557,518 A | 9/1996 | Rosen | 364/408 |
| 5,671,280 A | 9/1997 | Rosen | 300/24 |
| 5,745,886 A | 4/1998 | Rosen | 705/39 |
| 5,841,869 A | 11/1998 | Merklin et al. | 380/25 |
| 5,872,847 A | 2/1999 | Boyle et al. | 380/25 |
| 5,892,904 A | 4/1999 | Atkinson et al. | 395/187.01 |
| 5,963,980 A | * 10/1999 | Coulier et al. | 711/163 |
| 5,991,399 A | 11/1999 | Graunke et al. | 380/4 |
| 6,105,137 A | 8/2000 | Graunke et al. | 713/201 |
| 6,185,683 B1 | 2/2001 | Ginter et al. | 713/176 |
| 6,192,473 B1 | 2/2001 | Ryan, Jr. et al. | 713/168 |
| 6,212,636 B1 | 4/2001 | Boyle et al. | 713/16 R |
| 6,229,894 B1 | * 5/2001 | Van Oorschot et al. | 713/150 |
| 6,327,652 B1 | 12/2001 | England et al. | 713/2 |
| 6,330,588 B1 | 12/2001 | Freeman | 709/202 |
| 6,338,139 B1 | 1/2002 | Ando et al. | 713/168 |
| 6,363,486 B1 | 3/2002 | Knapton, III | 713/200 |
| 6,367,012 B1 | 4/2002 | Atkinson et al. | 713/176 |
| 6,389,537 B1 | 5/2002 | Davis et al. | 713/187 |
| 6,477,252 B1 | 11/2002 | Faber et al. | 380/200 |
| 6,480,961 B2 | 11/2002 | Rajasekharan et al. | 713/200 |
| 2002/0007452 A1 | 1/2002 | Traw et al. | 713/152 |
| 2002/0069365 A1 | 6/2002 | Howard et al. | 713/201 |
| 2002/0107803 A1 | 8/2002 | Lisanke et al. | 705/51 |
| 2002/0120936 A1 | 8/2002 | Del Beccaro et al. | 725/61 |
| 2002/0152173 A1 | 10/2002 | Rudd | 705/57 |

FOREIGN PATENT DOCUMENTS

GB 2260629 A * 4/1993 ........... G06F/12/08

OTHER PUBLICATIONS

"Phoenix Technologies Partners with Secure Computing in Enterprise Security Marketplace" Jul. 12, 2001, Business Wire, courtesy of dialog text search, p. 1–2.

* cited by examiner

Primary Examiner—Justin T. Darrow
(74) Attorney, Agent, or Firm—Lee & Hayes, PLLC

(57) ABSTRACT

Curtained operation provides trusted execution of code and secrecy of data in a secure memory. Curtained code can only be executed from within certain address ranges of a curtained memory region secure against access by code from without the region. Code entry points are restricted, and atomic execution is assured. The memory is organized into multiple hierarchically curtained rings, and peer subrings are denied access to each other as well as to more secure rings.

70 Claims, 3 Drawing Sheets

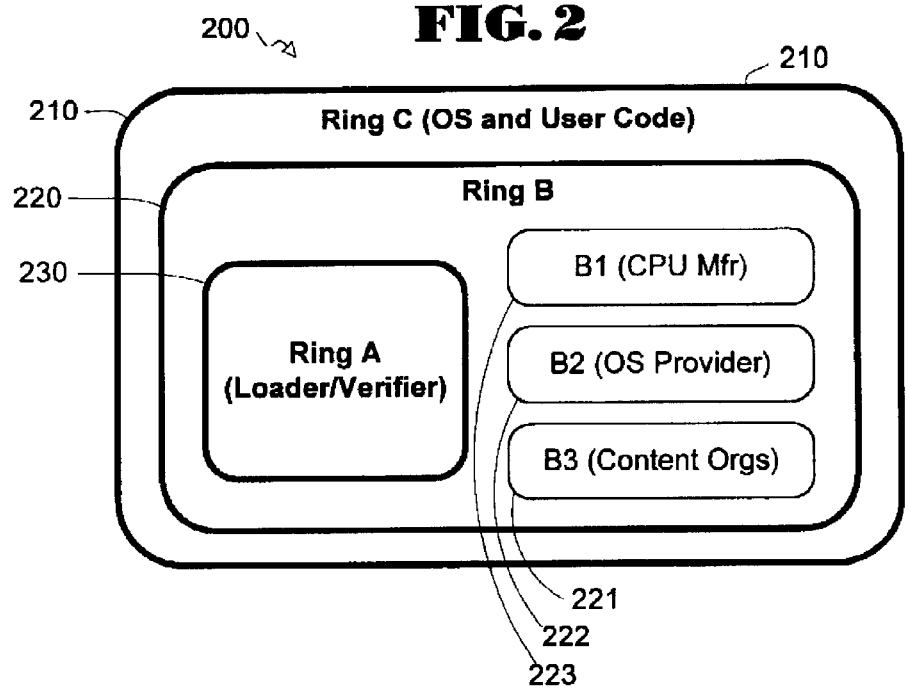
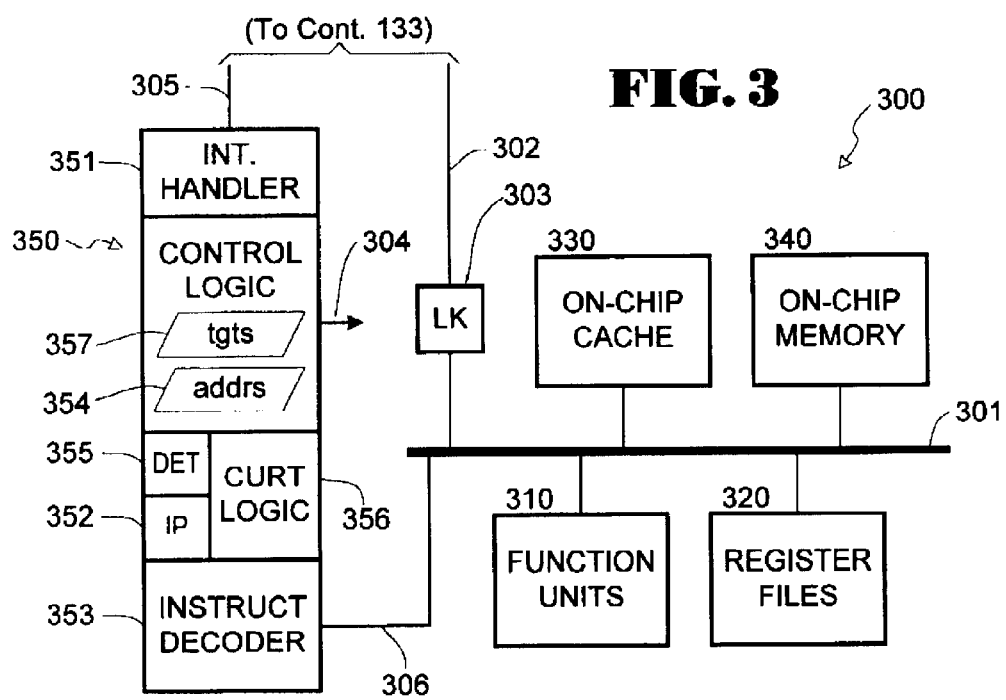

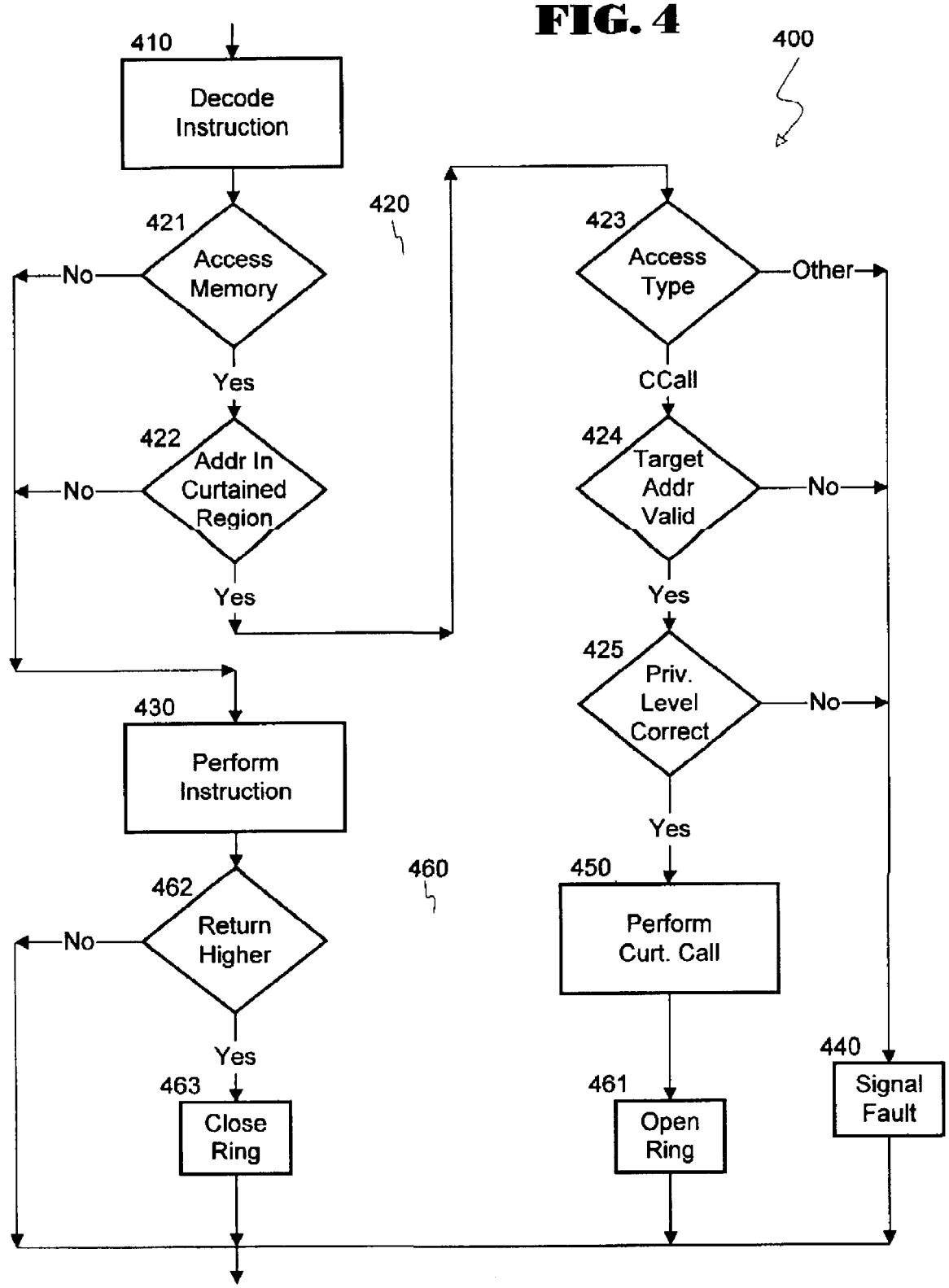

SECURE EXECUTION OF PROGRAM CODE

RELATED APPLICATIONS

This application is related to co-pending commonly assigned provisional application Serial No. 60/105,891, filed on Oct. 26, 1998, entitled "System and Method for Authenticating an Operating System to a Central Processing Unit, Providing the CPU/OS With Secure Storage, and Authenticating the CPU/OS to a Third Party", application Ser. No. 09/227,611, filed on Jan. 8, 1999, now U.S. Pat. No. 6,327,652, entitled "Loading and Identifying a Digital Rights Management Operating System", application Ser. No. 09/227,568, filed Jan. 8, 1999, entitled "Key-Based Secure Storage", and application Ser. No. 09/227,559, filed Jan. 8, 1999, entitled "Digital Rights Management Using One Or More Access Prediates, Rights Manager Certificates, And Licenses". The disclosures of these applications are hereby incorporated by reference.

TECHNICAL FIELD

The present invention relates to electronic data processing, and more particularly concerns computer hardware and software for manipulating keys and other secure data so as to prevent their disclosure, even to persons having physical control of the hardware and software.

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

BACKGROUND

More and more digital content is being delivered online over public networks, such as the Internet. For a client, online delivery improves timeliness, convenience, and allows more sophisticated content. For a publisher, online delivery provides mechanisms for enhanced content and reduces delivery costs. Unfortunately, these worthwhile attributes are often outweighed by the disadvantage that online information delivery makes it relatively easy to access pristine digital content and to pirate the content at the expense and harm of the publisher.

Piracy of online digital content is not yet a great problem. Most premium content that is available on the Web is of low value and therefore casual and organized pirates do not yet see an attractive business stealing and reselling content. Increasingly, higher-value content is becoming available. Audio recordings are available now, and as bandwidths increase, video content will start to appear. With the increase in value of online digital content, the attractiveness of organized and casual theft increases.

The unusual property of digital content is that the publisher or reseller transmits the content to a client, but continues to restrict rights to use the content even after the content is under the sole physical control of the client. For instance, a publisher will often retain copyright to a work so that the client cannot reproduce or publish the work without permission. A publisher could also adjust pricing according to whether the client is allowed to make a persistent copy, or is just allowed to view the content online as it is delivered. These scenarios reveal a peculiar arrangement. The user that possesses the digital bits often does not have full rights to their use; instead, the provider retains at least some of the rights. In a very real sense, the legitimate user of a computer can be an adversary of the data or content provider.

"Digital rights management" is fast becoming a central theme as online commerce continues its rapid growth. Content providers and the computer industry must quickly address technologies and protocols for ensuring that digital data is properly handled in accordance with the rights granted by the publisher. If measures are not taken, traditional content providers may be put out of business by widespread theft or, more likely, will refuse to deliver content online.

Traditional security systems ill serve this problem. There are highly secure schemes for encrypting data on networks, authenticating users, revoking users, and storing data securely. Unfortunately, none of these systems address the assurance of content security after it has been delivered to a client's machine. Traditional uses of smart cards offer little help. Smart cards merely provide authentication, storage, and encryption capabilities. Ultimately, useful content must be delivered to the host machine for display, and again, at this point the bits are subject to theft. Cryptographic coprocessors provide higher-performance smart-card services, and are usually programmable; but again, any operating system or process, trusted or not, can use the services of the cryptographic processor.

There appear to be three solutions to this problem. One solution is to do away with general-purpose computing devices and use special-purpose tamper-resistant boxes for delivery, storage, and display of secure content. This is the approach adopted by the cable industry and their set-top boxes, and appears to be the model for DVD-video presentation. The second solution is to use proprietary data formats and applications software, or to use tamper-resistant software containers. The third solution is to modify the general-purpose computer to support a general model of client-side content security and digital rights management.

This invention is directed to a system and methodology that employs the third category of solutions.

The fundamental building block for client-side content security is a secure operating systems. If a computer can be booted into an operating system that is trusted to honor content rights, and only allows authorized applications to access rights-restricted data, then data integrity within the machine can be assured. The stepping-stone to a secure operating system is sometimes called "Secure Boot" If secure boot cannot be assured, whatever rights management system the OS provides can always be subverted by booting into an insecure operating system.

Secure boot of an operating system is usually a multistage process. A securely booted computer runs a trusted program at startup. The trusted program loads another program and checks its integrity, e.g., by using a code signature, before allowing it to run. This program in turn loads and checks subsequent layers. This proceeds all the way to loading trusted device drivers, and finally a trusted application. Related patent application Serial No. 60/105,891 describes an overall method of securely booting an operating system, and also notes related technology.

Booting an operating system or other program securely requires some way to execute code such that the code cannot be tampered with as it is being executed, even by one who is in physical possession of the computer that executes the code. In the scenarios discussed above, digital content is loaded from a network or from a medium into a personal computer at a remote location. The PCs' owners have full freedom to run arbitrary programs for compromising any safeguards, to replace ROM containing trusted BIOS code, to bypass dongles, to introduce rogue hardware, even to analyze signals on buses. Today's low-end computers are open systems, both logically and physically. Indeed, most computers of all kinds are open, at least to those having supervisory privileges and physical possession.

At the same time, conventional techniques for restricting subversion in this environment impose either unacceptable burdens upon legitimate users or they are unacceptably expensive. S. T. Kent's Ph.D. thesis, "Protecting Externally Supplied Software in Small Computers", MIT Laboratory for Computer Science 1980, is an early proposal for tamper-resistant modules. S. R. White, "ABYSS: A Trusted Architecture for Software Protection", Proceedings, 1987 IEEE Symposium on Security and Privacy, pp. 38–51, presents a trusted architecture having a secure processor in a tamper-resistant package such as a chip, for enforcing limitations to execute application code. This system, however, would require major changes to existing processor architectures, and would still be limited to the small instruction set of a primitive security coprocessor. Also, it is limited to on-board, physically inaccessible memory dedicated to security functions.

The practicality of trusted operating systems still requires an inexpensive way to execute code that cannot be easily modified or subverted, a way that does not necessitate new or highly customized processors and a way that performs as much as possible of the secure execution in software.

SUMMARY OF THE INVENTION

The present invention provides a more general-purpose microprocessor and memory-system architecture that can support authenticated operation, including authenticated booting of an operating system. This new class of secure operation is called curtained execution, because it can be curtained off and hidden from the normal operation of the system. The code executed during such operation is called curtained code; it can preserve secret information even from a legitimate user in physical possession of an open computer.

The invention allows users to load and reload data and programs for authenticating operations without physically modifying (or having someone else modify) their computers. For example, a software or content provider can provide encrypted keys along with code for manipulating those keys to users without fear of compromising the keys, because the code can only be executed in a manner that preserves their secrecy.

Curtained operation does not make great demands upon a processor, and requires few modifications from standard designs. It allows innovation in particular implementations and applications to take place at software-development cycle times, rather than at the slower pace of hardware versions. It gives content providers and program developers an opportunity to design and personalize secure operations for their specific needs. Further, curtained code is not limited to the small instruction sets, program sizes or memory requirements of dedicated secure processors or coprocessors, and it promises applications beyond its core purpose of authenticating other programs.

Curtained operation generalizes the concept that certain memory regions are only accessible to certain code. Whereas conventional memory-protection schemes grant or deny memory-access rights to designated address ranges based upon an internal kernel or supervisory state of the processor regardless of the code executing, curtained operation ties access rights to certain code. Curtained code can only be executed from certain locations, and the physical address from which it is executed determines its access rights. Other applications or operating system code does not have the necessary rights to modify the curtained memory regions or to obtain secrets stored in such regions.

Curtained execution also forces atomic execution of the curtained code, to prevent spurious code from hijacking its operation or from stealing secret information stored in machine registers following a legitimate initial call.

THE DRAWING

FIG. 2 is a symbolic map showing memory regions organized according to the invention.

FIG. 3 is a block diagram of a processor for carrying out the invention.

FIG. 4 is a flowchart of a method for curtained code execution according to the invention.

DETAILED DESCRIPTION

Figure 1:
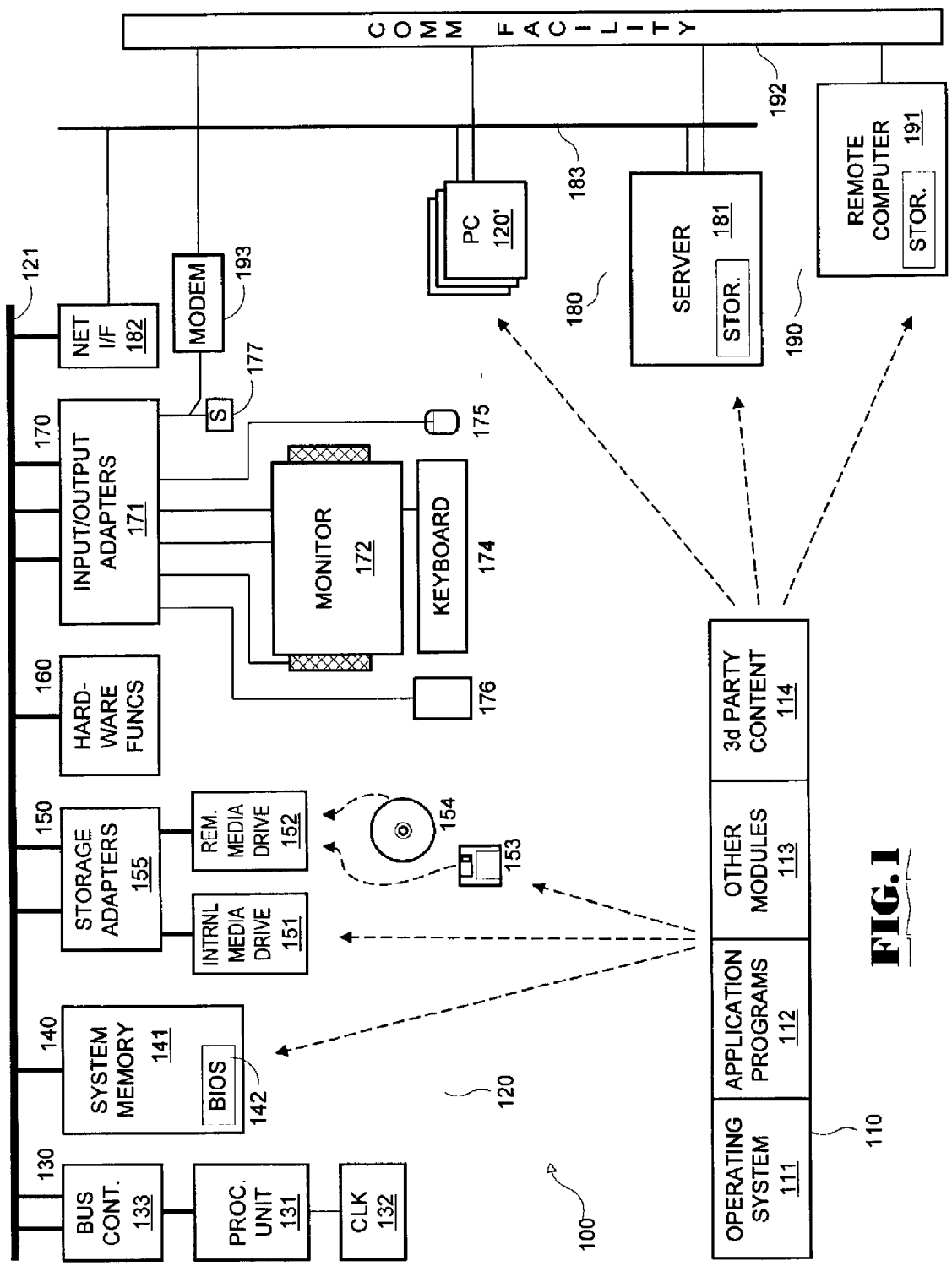
FIG. 1 is a block diagram of a computer system in which the invention can be implemented.

This description and the accompanying drawing illustrates specific examples of embodiments in which the present invention can be practiced, in enough detail to allow those skilled in the art to understand and practice the invention. Other embodiments, including logical, electrical, and mechanical variations, are within the skill of the art, as are other advantages and features of the invention not explicitly described. The scope of the invention is to be defined only by the appended claims, and not by the specific embodiments described below.

The description proceeds from an illustrative environment to an organization for a secure memory area and then to mechanisms for executing trusted code that can access the memory. Finally, some representative applications of curtained operation are presented.

Environment

FIG. 1 is a high-level diagram of an illustrative environment 100 having software 110 and hardware 120 for hosting the invention as executable instructions, data, and/or electronic and mechanical components. Other suitable environments, and variations of the described environment are also possible.

Hardware components 120 are shown as a conventional personal computer (PC) including a number of components coupled together by one or more system buses 121 for carrying instructions, data, and control signals. These buses may assume a number of forms, such as the conventional ISA, PCI, and AGP buses. Some or all of the units coupled to a bus can act as a bus master for initiating transfers to other units. Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers output audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. FIG. 1 illustrates a communications facility 192 such as a public switched telephone network for a WAN 190 such as an intranet or the internet. PC 120 can employ an internal or external modem 193 coupled to serial port 177. Other technologies such as packet-switching ISDN, ATM, DSL, and frame-relay are also available. In a networked or distributed-computing environment, some of the software 110 may be stored on the other peer PCs 120', or on computers 181 and 191, each of which has its own storage devices and media.

Software elements 110 may be divided into a number of types whose designations overlap to some degree. For example, the previously mentioned BIOS sometimes includes high-level routines or programs which might also be classified as part of an operating system (OS) in other settings. The major purpose of OS 111 is to provide a software environment for executing application programs 112 and for managing the resources of system 100. An OS such as the Microsoft® Windows® operating system or the Windows NT® operating system commonly implements high-level application-program interfaces (APIs), file systems, communications protocols, input/output data conversions, and other functions.

Application programs 112 perform more direct functions for the user. A user normally calls them explicitly, although they can execute implicitly in connection with other applications or by association with particular data files or types. Modules 113 are packages of executable instructions and data which may perform functions for OSs 111 or for applications 112. Dynamic link libraries (.dll) and class definitions, for instance, supply functions to one or more programs. Content 114 includes digital data such as movies, music, and other media presentations that third parties make available on media or by download for use in computer 120. This material is frequently licensed for a charge, and has certain restrictions placed upon its use.

Secure Memory Organization

FIG. 2 is a symbolic map of a memory space 200 in system 100. For purposes of illustration, consider it to have a potential size of 4 Gbytes, so that 32 bits of address suffice to access all of it. Space 200 can exist in a single physical memory, or in several different kinds of storage, such as ROM, read/write RAM, flash RAM, and so forth. Also, partially or totally separate address spaces are a straightforward extension. Space 200 has three hierarchical rings 210, 220, and 230 relevant to the present discussion. Although the information stored in these rings can be similar to that contained in the rings sometimes used in processors that employ conventional privilege levels or operational modes, their mechanism differs.

Ring 210 is called Ring C or the outer ring, and has no protection or security against any kind of read or write access by any code located there or in the other rings in the present system, and normally occupies almost all of the available address space. All normal user code and data resides in this ring. The operating system, including the kernel, also resides there. Ring C has no read or write access to the other two rings.

The secure rings 220 and 230 together comprise the secure or curtained region of memory. No program code in Ring C has any access to data within them. Ring C code, can, however, be provided some ability to initiate the execution of code located there, as described below. Conversely, any code in rings 220 and 230 has full access to Ring C, including reading and writing data, and executing program code.

Secure ring 220, also called Ring B, is an inner ring to Ring C, and has full access privileges to its outer Ring C; but Ring B is in turn an outer ring with respect to ring A, and thus has only restricted access to this inner ring. In this embodiment, the major purpose of Ring B is to hold most of the code that carries out authenticated-boot operations as mentioned above and in Application docket Serial No. 60/105,891. Thus, it can have both semipermanent storage such as nonvolatile flash RAM for code routines and volatile read/write memory for temporary data such as keys. A megabyte or less of the total address range would likely suffice for Ring B.

Secure ring 230, also called Ring A is an inner ring to both Rings B and C, and has full access to them for both code and data. It can also employ both nonvolatile and volatile technologies for storing code and data respectively. Its purpose in this embodiment is to store short loader and verifier programs and keys for authentication and encryption. Under the proper conditions, this code and data can be loaded in the clear. The address space required by Ring A is generally much smaller than that of Ring B. That is, this exemplary embodiment has the Ring A address range within the address range of Ring B, which in turn lies within the address range of Ring C. The address ranges of the rings need not be contiguous or lie in a single block. In order to prevent the access restrictions of the curtained rings from being mapped away by a processor, the address ranges of Rings A and B can be treated as physical addresses only. In one embodiment, virtual addresses are conventionally translated into their corresponding real addresses, and then the restrictions are interposed at the level of the resulting real addresses. Alternatively, a mechanisms could disable virtual addressing when certain addresses are accessed.

In the contemplated area of authentication of rights, it can be desirable to allow multiple parties to emplace their own separate authentication code and data that cannot be accessed by any of the other parties. For example, the manufacturer of the processor, the provider of the operating system or trusted application programs, and certain organizations that furnish digital content may all desire to execute their own authentication or other security routines and manage their own keys. At the same time, each party should be able to use code and data in the unsecure outermost Ring C, and to execute certain routines in the innermost Ring A. Dividing Ring B into peer subrings 221, 222, and 223 permits this type of operation. Ring 221, called Subring B1, has the privileges and restrictions of Ring B, except that it cannot access subring 222 or 223. It can access any part of Ring B that lies outside the other subrings, however. In this way, Subring B1 can function as though it were the only middle ring between Rings A and C for some purposes. Rings 222 (Subring B2), and 223 (Subring B3) operate in the same manner. A typical PC-based system might have three or four subrings, of 64–128 KBytes each. The code in these subrings is normally updated seldom, so that conventional flash memory is a convenient technology. Alternatively, the Ring-A loader could load the code and keys into RAM from an encrypted storage on disk on demand. Each subring will also require a small amount of scratch RAM, although rewritable flash memory might be suitable here as well; it might be desirable to use this for persisting the state of the system after a reboot. For extra flexibility, the memory available to the curtained memory subsystem can be allocated under the control of the Ring-A executive code. In order that no untrusted party can manipulate the memory map to reveal secrets, the map of the subrings in the Ring-B memory is kept in flash storage in curtained memory, under control of the curtained-memory controller in ring A.

In presently contemplated authentication procedures, Ring A code and keys are loaded under conditions in which protection against snoopers is not necessary; for example, they can be loaded when the microprocessor is manufactured. This simple step eliminates any requirement for building any cryptographic capabilities into the processor itself. Accordingly, Ring A code and keys can be stored in permanent ROM, with only a few hundred bytes of scratchpad RAM. This Ring A code is designed to load further curtained code and keys into ring B memory segments through a physically insecure channel, such as a public network, in such a manner that an eavesdropper, including even the owner of the target computer, cannot discover any secret information contained therein. This downloaded code, operating from the secure memory, then performs the authentication operations that third parties require before they will trust their valuable content to the rights-management software of the system. This new bootstrapping procedure permits building a wide class of secure operations and associated secret keys with greater security than would be possible in traditional assembly code, even with some form of authentication routines.

However, there are no restrictions on the code that can be loaded into any of the Ring-B memory areas. Examples of Ring-B code include smartcard-like applications for key management, secure storage, signing, and authentication. Further examples include electronic cash storage, a secure interpreter for executing encrypted code, and modules for providing a software licenses necessary for a piece of software to run. It is also possible to load only a part of an application, such as a module that communicates with a media player in unsecure memory for reducing software piracy.

Executing Curtained Code

The foregoing shows how untrusted code can be prevented from accessing the contents of a secure memory. The trusted code that is permitted to perform secure operations and to handle secret data is called curtained code. In other systems, such code must be executed within a privileged operating mode of the processor not accessible to the user, or from a separate secure processor. In the present invention, however, curtained code can only be executed from particular locations in memory. If this memory is made secure against intrusion, then the curtained code can be trusted by third parties. Other features restrict subversion through attempts at partial or modified execution of the curtained code.

FIG. 3 is a block digram showing relevant parts of a microprocessor 300 that can serve as part or all of processing unit 131, FIG. 1. Internal buses 301 carry data, address, and control signals to the other components of the processor on the integrated-circuit chip or module. Line 302 carries some of these signals to and from bus controller 133. Conventional function or execution units 310 perform operations on data from external memory, from register files 320, from cache 330, from internal addressable memory 340, or from any other conventional source. Memory 340, located on the same chip or module as the rest of processor 300, can have a number of technologies or combinations of technologies, such as dynamic read/write, read-only, and nonvolatile such as flash. The internal memory in this implementation partakes of the same address sequence as external system memory 140, although it can have or be a part of another sequence. The curtained memory rings can be partly or totally contained in addresses located within memory 340.

Control unit 350 carries out a number of operations for sequencing the flow of instructions and data throughout the processor; line 304 symbolizes control signals sent to all of the other components. Interrupt logic 351 receives interrupt requests and sends system responses via lines 305; in some systems, interrupt logic is conceptually and/or physically a part of controller 133. A conventional instruction pointer holds the address of the currently executing instruction. Instruction decoder 353 receives the instruction at this address on line 306, and produces a sequence of control signals 304 for executing various phases of the instruction. In modern pipelined and superscalar microprocessors, blocks 352 and 353 become very complex as many instructions are in process at the same time. Their basic functions, however, remain the same for the present purpose.

Control unit 350 further includes a specification or map 354 of one or more address ranges of the memory addresses desired to be curtained. The specification can be in any desired form, such as logic circuitry, a read-only table of addresses or extents, or even a small writable or rewritable storage array. If the addresses are in memories having separate address sequences, additional data specifying the particular memories can be added to the addresses within each sequence. A detector or comparator 355 receives the contents of instruction pointer 352 and the curtained-memory map 354. A curtained memory having multiple rings, subrings, or other levels can have a separate specification for each of the curtained regions. Alternatively, a single specification can explicitly designate the ring or subring that each address range in the specification belongs to.

If the current instruction address from pointer 352 matches any of the addresses in map 354, that instruction is included in a particular curtained code ring or module.

Curtain logic 356 then permits the control unit to issue signals 304 for performing certain operations, including reading and writing memory locations in the same ring, or a less privileged ring that might contain secrets. Additionally, as described below, certain opcodes are restricted to executing only when the CPU is executing curtained code. For example, if decoder 353 is executing an instruction not located within the range of curtained memory, and if that instruction includes an operand address located within the curtained-memory specification, control unit 350 blocks the signals 340 for reading the data at that address and for writing anything to that address. If a non-privileged access is attempted, the CPU or memory system can flag an error, fail silently, or take other appropriate action. If it is desired to place the curtain logic on a chip other than the processor, a new microprocessor instruction or operating mode can strobe the instruction pointer's contents onto an external bus for comparison with the curtained address ranges.

The execution of trusted code routines is frequently initiated by other programs that are less trusted. Therefore, curtain logic 356 must provide for some form of execution access to the curtained code stored in Rings A and B. However, full call or jump accesses from arbitrary outside code, or into arbitrary locations of the curtained memory regions, might possibly manipulate the secure code, or pieces of it, in a way that would reveal secret data or algorithms in the curtained memory. For this reason, logic 356 restricts execution entry points into curtained memory regions 220 and 230 as well as restricting read/write access to those regions. In one embodiment, the curtained code exposes certain entry points that the code writers have identified as being safe. These often occur along functional lines. For instance, each operation that a piece of curtained code can perform has an accompanying entry point. Calling subroutines at these entry points is permitted, but attempts to jump or call code at other entry points causes an execution fault.

An alternative allows automated checking of entry points and provides additional granularity of rights by permitting entry to curtained memory functions only through a special entry instruction. For example, a new curtained-call instruction, CCALL Ring, Subring, OpIndex, has operands that specify a ring, a subring, and a designation of an operation whose code is located within that ring and subring. This instruction performs conventional subroutine-call operations such as pushing a return address on a stack and saving state information. The stack or the caller's memory can be used to pass any required parameters. A conventional RETURN instruction within the curtained code returns control to the calling routine. Return values can be placed in memory, registers, etc.

When decoder 353 receives a CCALL instruction, curtain entry logic 356 determines whether the calling user code has the proper privileges, and whether the instruction's parameters are valid. If both of these conditions obtain, then the instruction is executed and the curtained routine is executed from its memory ring. If either condition does not hold, logic 356 fails the operation without executing the called code.

Logic 356 determines whether or not to execute the code by comparing the privilege level of the calling code and the operation-index parameter, and potentially whether the processor is already executing some other curtained code, with entries in a jump-target table 357 stored in a location accessible to it. The logic to enforce these requirements can be implemented in the memory controller 356, or by code executing in a highly privileged ring such as Ring A. Table I below illustrates one form of jump-target table. The table can be stored in the same curtained memory block as the code itself, or in a memory block that is more privileged; or it can be stored in special-purpose storage internal to the CPU or memory manager.

TABLE I

| Index | Target Address | User | Kernel | Curtain |
| --- | --- | --- | --- | --- |
| 0 | BAB-PC | FALSE | TRUE | TRUE |
| 1 | REVEAL-PC | TRUE | TRUE | TRUE |
| 2 | LOAD-PC | FALSE | FALSE | TRUE |

An entry for each index, 0–2, gives the (symbolic) target or start address of the code for that operation, and the privileges levels—user, kernel, or curtained—that are permitted to execute the code. "Curtained" level means that only other curtained code can call the routine. Other or finer privilege levels are possible. As an alternative to the above jump table, entry logic 356 could permit only a single entry point into each ring of curtained memory, and employ a passed parameter to specify a particular operation. Or it could, for example, permit calls only to addresses that are predefined as the beginnings of operations. The curtained code itself could verify and call the operation.

Restricting call access to curtained code within processor 300 still leaves open the possibility that outside rogue programs or devices might be able to hijack the code after its execution has begun in order to obtain secrets left in registers, or to otherwise modify machine state to subvert operation. Therefore, control unit 350 must ensure atomicity in executing the curtained code: once started, the code must perform its entire operation without interruption from any point outside the secure curtained-memory regions. In many cases, it is not necessary to execute an entire function atomically, but only a part. For example, only the code that verifies a bus-master card's identity need be performed atomically, and not its total initialization module.

Modern, open computer systems present a number of paths for obtaining access to any hardware, software, and data within the system. Personal computers in particular have been designed with very little thought for security, and with even less provision for restrictions against their legitimate users. Because many advantages of PCs and similar systems flow from an open environment, however, the protection for atomicity should impose as few restrictions as possible. The following outlines the major forms of gaining access to a memory in a conventional PC, and some of the ways to prevent access to a curtained segment of memory. Different systems may employ different combinations of these and other access restrictions.

Interrupts offer almost unlimited access to system resources. A simple way to prevent an interrupt from subverting curtained code is to issue a privileged instruction that causes a microprocessor to switch off all interrupts until a companion instruction switches them back on. A new instruction such as SnoopIntrerrupts Ring, Subring, OpIndex can call a curtained operation instead of the requested interrupt routine when an interrupt tries to access memory in a designated ring or subring, or operation. This can also be managed by having the curtained code set up the interrupt handlers to execute trusted curtained code. However, it is still important that the entry point into the curtained operation (that sets the interrupt vector) itself be protected against interruption so that the interrupt mechanism cannot be subverted by a malicious program.

An instruction having the form SetOpaque MemoryStart, MemoryLength/SetInterruptThrowError/SetTransparent does not switch off interrupts, but rather modifies the microprocessor's behavior. When an interrupt occurs, the processor clears all registers, except the stack pointer, before the interrupt is fielded. It is useful for long-running curtained operations that could reveal sensitive information, such as partial keys, if they were interrupted. An operand of this instruction can specify a memory range that the processor also clears before the interrupt is serviced. The first switch of the instruction activates a variant that causes a processor fault when an interrupt occurs, even in user mode. The user code can then disable operations and process—or decide not to process—the interrupt. The second switch turns off the SetOpaque execution mode. These can be user-mode operations, if desired. In at least some circumstances, this instruction should fault the processor when returning from the interrupt, to prevent an undesired jump into the middle of curtained code that might have been executing when the interrupt took control.

Illegal-operation and page faults are commonly encountered types of interrupt. Some systems might wish to handle these interrupts in the normal manner, and to disable only those interrupts generated asynchronously or externally to the microprocessor. Faults or interrupts produced by debuggers, however should be disabled; one of the oldest and easiest ways to hack any code is to pry it open with a debugger.

System buses commonly allow devices other than the processor to access memory on them. Bus master cards in a PC, for example, have the ability to read and write main memory. Curtained memory in this environment may require restrictions upon bus access to memory modules. If the secure memory is located on the same chip as the microprocessor, or within the same physically secure module, merely causing the processor not to relinquish the bus during curtained operation may offer adequate protection. Most cases of interest here, however, must assume a trusted chipset, and will protect the bus via a controller such as 133, FIG. 1. Block 303 in FIG. 3 represents one possible location for the memory-bus lock.

A new privileged instruction, LockBus, can disable all accesses to memory apart from those initiated by the processor executing authorized code. A companion UnlockBus instruction terminates this mode. In most systems, these instructions should be executable only in a privileged mode. An alternative type of instruction detects memory reads and writes by all devices on the bus other than the processor. A simple SnoopBus [Throw] form can set a flag, cause a fault, clear certain registers and/or memory, or call a curtained operation to cancel any outstanding privileges or identity. Parameters such as Ring, Subring, OpIndex can specify one or more memory ranges, thus allowing multiple processors and bus-master controllers to continue operating. Parameters such as MemoryStart, MemoryLength can monitor bus requests from other bus agents, then zero out a memory block before relinquishing the bus to the other agents. Any method of destroying the contents of a memory or register can obviously be used instead of zeroing. This type of instruction could be useful for user-mode application programs to protect their curtained operations from prying by the operating system or by debuggers, and might be allowed in user code. Another limitation available in some environments is to restrict outside devices only until a trusted routine has verified them or initialized them properly.

One further hardware restriction that is valuable from the perspective of protection against a computer's expansion cards is the ability to disable all DMA or bus-mastering activity from a device plugged into a particular PC slot until the device is explicitly identified, initialized and made safe. Early in the boot sequence, all bus-master activity is disabled on the PC bus controller: the slots are locked. The devices are identified and initialized using a conventional type of programmed IO. Only after correct initialization are the slots unlocked one by one, so that full functionality is available. Devices that are unknown, or that do not behave as they should, will not be enabled, and hence can not subvert operation or steal secrets. This action is called "slot locking."

FIG. 4 is a flowchart 400 of a method for providing curtained execution protection in a processor such as 300. For a single-level curtained memory, method 400 refers to the entire curtained region. For a memory organization such as 200 having multiple rings or subrings, the term "curtained region" means the levels inside or beside the ring in which the current instruction is located. For example, the curtained region for an instruction whose address is in Ring C in FIG. 2 comprises Ring B (including all its subrings) and Ring A; the curtained region for an instruction in Subring B1 comprises Subrings B2 and B3 (but not the rest of Ring B) and Ring A.

After block 410 decodes the current instruction, blocks 420 test memory addresses associated with the instruction. If the instruction uses virtual addresses, tests 420 operate upon the physical addresses as translated by decoder 410. Block 421 determines whether the instruction accesses any memory location during its execution. An instruction might read an operand or write data to a memory address, for example. If the instruction does not access any memory, or at least any memory that might contain a curtained region, then block 430 executes the instruction. If the instruction does involve a memory location, block 422 tests the address to determine whether it is within a region that is curtained off from the current region. If not, block 430 executes the instruction. If so, block 423 asks what type of access the instruction requests. If the access is anything other than the special curtained-call opcode, then block 440 signals a fault, and an appropriate error routine or logic circuit blocks the access. Other accesses include reading data from the location, writing data to it, or executing a normal instruction there.

The only access permitted into a curtained-memory ring is an execution access by a particular kind of instruction, such as the curtained call (CCALL) discussed above. If block 423 detects that this instruction desires to initiate execution of code at a location inside a region curtained from the current region, block 424 determines whether the target entry point is valid—this is, whether the requested index is in the jump table. Block 425 then determines whether the current instruction has the privilege level required to invoke the operation at the desired location. If either test fails, block 440 produces a fault. If both pass, block 450 executes the curtain-call instruction as described above.

Blocks 460 navigate among the rings and subrings of the curtained memory. A CCALL instruction causes block 461 to open the curtained-memory ring containing the target address of the call. That is, it makes that ring the current ring for the purposes of method 400. A routine starting at that address thus has read/write and execution access to the memory of the ring, and only rings inside or peer to that ring are now restricted curtained memory. Block 461 also engages any extra protection for ensuring atomicity of the routine being executed at the new current level, such as interrupt suspension or bus locking. A routine executing in curtained memory can end with a normal Return instruction.

If the routine was called from a less secure ring, block 462 causes block 463 to close the current ring and retreat to the ring from which the call was made, either a less secure ring of curtained memory, or the outer, unsecured memory of Ring C.

Operations with Curtained Code

The following illustrate a few representative applications of curtained operation.

Loading and reloading secure routines is difficult in conventional practice. The procedure below allows even an untrusted user to field-load curtained code and secret keys into Ring-B memory without being able to discover the secret keys.

(1) Execute an authentication and key-exchange protocol. If the protocol runs successfully, keep the session key in Ring-A curtained RAM. The authentication step assures the software and key publisher that the target is truly a piece of trusted code executing in a protected environment, and not an arbitrary application or operating system that will read and abuse the secret keys. This can be assured by equipping the loader with a public-key cryptography key pair and a certificate from a trusted manufacturer or publisher that indicates the source of the code, and therefore that it is executing in a trusted (curtained) computer system.

(2) After successful completion of the previous step, load a block of encrypted code and accompanying keys into Ring-B flash memory. This code should be protected from alteration by a check-sum, digital signature, or other means. It should be preceded by any entry-protection mechanism, such as a jump table.

(3) Verify Ring B, if secret keys are to be granted to this ring, or if desired for extra assurance that the code has not been tampered with. Verification can be carried out by generating a signature with a secret key such as a hash digest of all the code in one of the B rings and a nonce supplied with the code to be loaded in this session. A nonce is a single-use unpredictable value, of the type used in a zero-knowledge proof.

(4) Get the name or description of a set of opcodes in a Ring-B code-set. This allows a user to select a set of curtained operations—say from the processor-manufacturer's subring—that the preceding step has verified. This name permits an application or operating system to select an appropriate code-set among the many that might be loaded in a system. It could be a simple textual description such as "MS Key Store 3.0," or it could be a cryptographic digest of the data that comprises the curtained memory region.

(5) Swap codes sets to and from secure memory or to and from some other persistent store such as disk, if there are more code sets than Ring-B slots available for them. If a ring-B module contains secret keys, the Ring-A loader must encrypt them prior to exporting them to main memory. In most cases the operating system handles the transfer to and from disk.

(6) Allocate specific Ring-B memory to particular code sets, and collect garbage to avoid holes.

The following boot-block pseudocode sets an identity to the public key of a piece of signed code.

RetryLabel:
CCALL BeginBoot
[MAC, Signature, Public Key] // of all of bootblock
[check signature of next code and data block][Pks of next blocks]
if (SignatureOK) CCALL CompleteBoot
else CCAL TerminateBoot
[next section of boot code]

The three curtained-code operations for setting this identity are:

[User=FALSE, Kernel=True, Curtained=TRUE]
BeginBoot
OldstackPointer=StackPointer
SetOpaque
TemporaryIdentity=NULL
SnoopBus TerminateBoot
SnoopInterrupts TerminateBoot
Calculate MAC of bootblock from address inferred from *SP p1 If (signature good for stated public key) TempID=PublicKey
Else TempID=PublicKey
[Zero registers and scratch RAM]
Return
[User=TRUE, Kernel=True, Curtained=TRUE]
TerminateBoot
TempId=NULL
StackPointer=OldStackPointer+1
Goto ReTryLabel
[User=FALSE, Kernel=True, Curtained=TRUE]
CompleteBoot
CodeIdentity=TempId
UnSnoopInterrupts
UnSnoopBus
SetTransparent Given a seed and a processor identity, the next code swatch generates a storage key for securing content. The seed and the return value are stored in the calling program's memory space.

[User=FALSE, Kernel=True, Curtained=TRUE]
GenerateKey (&InSeed, &ReturnVal)
SetOpaque
IF(CodeIdentity==NULL) return NULL
[Compute a pseudo random number 'Key' using a seed derived from InSeed, MySecretKey, codeIdentity]
RetVal=Key
[zero registers and scratch RAM]
SetTransparent
Return Checking OS identity is a major application for curtained operation. The first time the following operation executes, it builds a digest of the OS. Later invocations check new digest against the first one to ensure that the OS image has not changed, and revokes its identity if it has.

[User=FALSE, Kernel=True, Curtaine=TRUE]
CheckIdentity (MemoryTable)
SetOpaque
NewDigest=[CreateDigest]
If (OldDigest==NewDigest){
    Set Transparent
    Return
}
If (OldDigest!=NewDigest) {
    codeIdentity=NULL
    SetTransparent Return
}
SetTransparent
Return The initial identity can be derived from other steps, or built up in stages in curtained RAM before newly loaded code is executed. Transitive trust then ensures that security is as good as the initial check.

Conclusion

The foregoing describes a system and method for curtained execution of code that can be trusted by a third party in an environment where a possibly hostile person has physical possession of the system upon which the trusted code executes. It permits field loading of sensitive code and data by such a person. Other advantages and variations will be apparent to those skilled in the art.

For example, different security requirements and different systems may permit different or relaxed provisions for securing the curtained memory and code against certain kinds or levels of attack. For example, legacy systems might not permit all of the components described above to be fabricated in a single chip. In this case, a potted or otherwise secure chipset between the existing microprocessor and its motherboard socket can implement curtained execution and memory. Some existing microprocessors have system management or other restricted operating modes that can provide some or most of the security requirements. Curtained operation can be extended to additional rings; all or most of the operating system might be placed in a curtained ring, for example.

Dynamic resizing or layout of secure memory ring is feasible in some cases; the curtain logic or memory manager should clear out ring contents and memory pages before their access rights are changed. Although the present implementation permits only real addresses in curtained memory, virtual addressing may be feasible, given adequate safeguards against mapping away the access security.

Some processors already posses system management modes that provide access, entry-point, and atomicity restrictions that may provide enough security that curtained memory could be mapped into their address spaces, especially if only a single curtained ring or region is needed.

Other applications for curtained operation can be easily imagined. A secure interpreter for encrypted code can be executed from curtained memory. Certified execution can construct a hashed digest of actual executed code that is attested as correct by curtained code. In addition to authenticating an OS upon boot-up, calls for private keys can be made to require a curtained operation to check its continuing integrity. Where rights are given for a fixed number of iterations or for a certain time interval, curtained code can implement a monotonic counter or clock. Certificate revocation lists, naming components that are known to be comprised or otherwise undesirable, can employ such a secure counter to prevent components from being removed from a list. A number of rights-management functions demand a tamper-resistant log. A signed or encrypted Ring-C file having a Ring-B digest or key can serve this purpose. Secure interpretation of a certificate that grants rights to code identity enables more levels of indirection between boot-code authentication and rights to content; this facilitates fixing bugs and updating components without losing keys already stored in a system. Any rights that rely upon continued secrecy of keys or the strength of particular cryptographic algorithms is fragile. Curtained operation is sufficiently flexible to field-load changes to circumvent compromises of secret data or code. A Ring-B subring can also provide smart-card types of service, and could offer those services to a trusted operating system.

What is claimed is:

1. A method of executing program code in a secure manner in a data processor, comprising:
    fetching an instruction for execution from a first location in a memory;
    determining that the instruction accesses a second location within a secure region of the memory;
    accessing the second location only if the first location lies within a predetermined region of the memory.

2. The method of claim 1 where the secure region comprises a range of addresses of the memory.

3. The method of claim 1 where the accessing the second location comprises accessing data in the secure memory.

4. The method of claim 1 where the accessing the second location comprises accessing code in the secure memory.

5. The method of claim 4 further comprising:
    comparing the second location with a set of predetermined entry locations:
    executing the instruction at the second location only if it is contained in the set of locations.

6. A medium carrying computer readable representations for causing a computer to carry out the method of claim 1.

7. A method of executing program code in a secure manner in a data processor, comprising:
    fetching an instruction for execution from a first location in a memory;
    determining that the instruction accesses a second location within a secure region of the memory;
    accessing the second location only if the first location lies within a predetermined region of the memory, where the secure region comprises a first range of addresses of the memory and the predetermined region comprises a second range of addresses of the memory.

8. The method of claim 7 where the predetermined region lies at least partly within the secure region.

9. The method of claim 7 where the addresses of the predetermined region are physical addresses.

10. The method of claim 9 further comprising disabling virtual addressing of the memory before fetching the instruction.

11. The method of claim 9 further converting virtual addresses to physical address before determining that the instruction accesses the second location.

12. A method of executing program code in a secure manner in a data processor, comprising:
    fetching an instruction for execution from a first location in a memory;
    determining that the instruction accesses a second location within a secure region of the memory;
    accessing the second location only if the first location lies within a predetermined region of the memory, where the accessing the second location comprises accessing code in the secure memory; and further comprising:
    comparing the second location with a set of predetermined entry locations;
    executing the instruction at the second location only if it is contained in the set of locations;
    comparing a current privilege level with a predetermined required privilege level associated with the second location;
    executing the instruction at the second location only if the current privilege level is at least as high as the required privilege level.

13. A method of executing program code in a secure manner in a data processor, comprising:
fetching a sequence of instructions in the code;
determining that the code accesses a secure region of a memory;
accessing the secure memory region only if the code is located within the secure region of the memory.

14. A medium bearing computer readable representations for causing a computer to carry out the method of claim 13.

15. A method of executing program code in a secure manner in a data processor, comprising:
fetching a sequence of instructions in the code;
determining that the code accesses a secure region of a memory;
accessing the secure memory region only if the code is located within the secure region of the memory, and further comprising executing at least a part of the code atomically.

16. The method of claim 15 where executing the code atomically comprises restricting the operation of interrupts to the processor executing the code while the sequence of instructions is executing.

17. The method of claim 16 where executing the code atomically comprises preventing interrupts to the processor executing the code while the sequence of instructions is executing.

18. The method of claim 16 where executing the code atomically comprises replacing a normal interrupt handler of the processor with another handler that prevents accesses to the secure memory region during execution of the code.

19. A method of executing program code in a secure manner in a data processor, comprising:
fetching a sequence of instructions in the code;
determining that the code accesses a secure region of a memory;
accessing the secure memory region only if the code is located within the secure region of the memory, and further comprising destroying at least some data upon occurrence of a specified event.

20. The method of claim 19 wherein the destroyed data comprises contents of at least some locations in the secure memory.

21. The method of claim 19 wherein the destroyed data comprises contents of at least one register of a processor executing the code.

22. The method of claim 19 where the event is an interrupt sent to a processor executing the code.

23. The method of claim 19 where the event is a reboot of the processor executing the code.

24. The method of claim 19 where the event is an attempt by a device external to the processor executing the code to access the secure memory region.

25. A method of executing program code in a secure manner in a data processor, comprising:
fetching a sequence of instructions in the code;
determining that the code accesses a secure region of a memory;
accessing the secure memory region only if the code is located within the secure region of the memory, and further comprising restricting access to the secure memory region by devices external to the processor executing the code.

26. The method of claim 25 where access is restricted during execution of the code.

27. The method of claim 25 where restricting access to the secure memory region comprises locking a memory bus coupled to the memory.

28. The method of claim 25 where restricting access to the secure memory region comprises preventing a bus master from accessing the region.

29. A method of executing program code in a secure manner in a data processor, comprising:
fetching code comprising a sequence of instructions from a memory having a secure region including multiple secure rings arranged in a hierarchy;
determining that the code accesses one of the multiple secure rings;
accessing the first ring only if the code is located within the same ring of the multiple rings or within a ring higher in the hierarchy.

30. The method of claim 29 where the secure memory region comprises a range of addresses in the memory.

31. The method of claim 29 where the secure rings comprise ranges of addresses within an address range of the secure memory region.

32. The method of claim 29 where the hierarchy has two secure levels within an outer unsecure level.

33. The method of claim 32 where one of the secure rings is higher in the hierarchy than the other ring.

34. The method of claim 29 where the memory has at least first and second subrings within one of the secure rings, and further comprising:
determining whether the code accesses the first subring within the first ring;
accessing the first subring only if the code is located within the first subring of the one ring;
determining whether the code accesses the second subring of the one ring;
accessing the second subring only if the code is located within the second subring of the one ring.

35. The method of claim 34 further comprising:
determining whether the code accesses the one ring outside both the first and the second subrings;
accessing the one ring outside both the first and the second subrings of the first ring of the code is located within either the first or the second subring of the one ring.

36. The method of claim 33 where another of the secure rings is inner to the one ring, and further comprising:
determining whether the code accesses the one ring, including the first and second subrings thereof;
accessing the one ring, including the first and second subrings, if the code is located in the other, inner ring.

37. A medium carrying computer readable representations for causing a computer to carry out the method of claim 29.

38. A method for executing program code in a secure manner in a data processor having a memory, comprising:
defining a C ring and a B ring located within the C ring in the memory;
defining at least B1 and B2 subrings both located within the B ring but disjoint from each other in the memory;
restricting code located in the C ring from accessing memory within the entire B ring;
restricting code located in the B1 subring from accessing memory within the B2 subring;
restricting code located in the B2 subring from accessing memory within the B1 subring.

39. The method of claim 38 where each of the rings and subrings is defined by a respective range of addresses in the memory.

40. The method of claim 39 where the addresses of the B ring are physical addresses in the memory.

41. The method of claim 39 where the code located in a particular ring or subring had instructions located at addresses within its respective ring or subring.

42. The method of claim 38 further comprising:
defining an A ring located within the B ring;
restricting code located in the B and C rings from accessing memory within the a ring.

43. The method of claim 42, where the A ring is located outside all subrings of the B ring.

44. The method of claim 42 further comprising permitting code located in the A ring to access memory in the entire B ring, including its subrings.

45. A medium carrying computer readable representations for causing a computer to carry out the method of claim 38.

46. A data processor for executing secure code residing in a memory, comprising:
an instruction decoder for determining that a current instruction belongs to the secure code;
an instruction pointer for holding an address of a current instruction in the memory;
control logic coupled to the instruction decoder for executing the current instruction only if the address in the instruction pointer lies within one or more predetermined regions of the memory.

47. The data processor of claim 46 where at least one of the predetermined memory regions is defined by a range of addresses in the memory.

48. The data processor of claim 46 where the instruction decoder responds to one of a defined set of distinguished operation codes for identifying the current instruction as accessing secure code.

49. The data processor of claim 48 where the instruction decoder executes a current instruction having one of the distinguished operation codes only when the current instruction matches one of a set of defined target locations in the memory.

50. A data processor for executing secure code residing in a memory, comprising:
an instruction decoder for determining that a current instruction belongs to the secure code;
an instruction pointer for holding an address of a current instruction in the memory;
control logic coupled to the instruction decoder for executing the current instruction only if the address in the instruction pointer lies within one or more predetermined regions of the memory, where at least a portion of one of the predetermined memory regions is implemented in a technology different from that of the remainder of the same portion.

51. A data processor for executing secure code residing in a memory, comprising:
an instruction decoder for determining that a current instruction belongs to the secure code;
an instruction pointer for holding an address of a current instruction in the memory;
control logic coupled to the instruction decoder for executing the current instruction only if the address in the instruction pointer lies within one or more predetermined regions of the memory, where at least a portion of one of the predetermined memory regions is implemented in a technology different from that of at least a portion of another one of the regions.

52. A data processor for executing secure code residing in a memory, comprising:
an instruction decoder for determining that a current instruction belongs to the secure code;
an instruction pointer for holding an address of a current instruction in the memory;
control logic coupled to the instruction decoder for executing the current instruction only if the address in the instruction pointer lies within one or more predetermined regions of the memory, where the memory is on the same module with the instruction decoder, the instruction pointer, and the control logic.

53. The data processor of claim 52 where the memory is on the same integrated-circuit chip with the instruction decoder, the instruction pointer, and the control logic.

54. The data processor of claim 52 where the memory includes a flash memory for holding the secure code.

55. The data processor of claim 54 where the memory further includes read/write memory accessible to the secure code.

56. A data processor for executing secure code residing in a memory, comprising:
an instruction decoder for determining that a current instruction belongs to the secure code;
an instruction for holding an address of a current instruction in the memory;
control logic coupled to the instruction decoder for executing the current instruction only if the address in the instruction pointer lies within one or more predetermined regions of the memory, where the instruction decoder responds to one of a defined set of distinguished operation codes for identifying the current instruction as accessing secure code, where the processor operates at multiple different privilege levels, and where the instruction decoder executes a current instructing having at least one of the distinguished operation codes only if the processor is currently operating at a particular one of the levels.

57. A data processor for executing secure code residing in a memory, comprising:
an instruction decoder for determining that a current instruction belongs to the secure code;
an instruction pointer for holding an address of a current instruction in the memory;
control logic coupled to the instruction decoder for executing the current instruction only if the address in the instruction pointer lies within one or more predetermined regions of the memory, and further comprising curtain logic coupled to the instruction decoder for restricting access to a predetermined range of addresses in the memory by any instruction not belonging to the secure code.

58. The data processor of claim 57 further comprising a bus lock responsive to the curtain logic for prohibiting access to the predetermined address range during execution of the secure code.

59. The data processor of claim 58 where the system includes at least one bus master external to the processor, and where the bus lock disables any bus master during execution of the secure code.

60. A data processor for executing secure code residing in a memory, comprising:
an instruction decoder for determining that a current instruction belongs to the secure code;
an instruction pointer for holding an address of a current instruction in the memory;
control logic coupled to the instruction decoder for executing the current instruction only if the address in the instruction pointer lies within one or more predetermined regions of the memory, and further comprising an interrupt handler for restricting the processing of interrupts during execution of the secure code.

61. The data processor of claim 60 where the interrupt handler disables interrupts during execution of the secure code.

62. The data processor of claim 60 where the interrupt handler disallows devices external to the processor from accessing at least one of the predetermined memory regions during execution of the secure code.

63. A medium bearing a computer readable representation configured to cause a processor to execute curtained code.

64. The medium of claim 63, wherein the computer readable representation is further configured to cause the processor to execute the curtained code from a curtained portion of a memory.

65. The medium of claim 63, wherein the computer readable representation is further configured to cause the processor to execute the curtained code from a curtained portion of a memory having multiple portions each bearing a respective security curtain level.

66. The medium of claim 63, wherein the computer readable representation is further configured to cause the processor to execute the curtained code from a curtained portion of a memory that also includes open portions exclusive of the curtained portion.

67. The medium of claim 63, wherein the computer readable representation is further configured to cause the processor to execute the curtained code from a predetermined portion of a memory comprising multiple segregated curtained portions.

68. The medium of claim 63, wherein the computer readable representation is further configured to cause the processor to execute the curtained code atomically.

69. The medium of claim 63, wherein the computer readable representation configured to cause a processor to execute curtained code comprises a computer readable representation configured to:

fetch a sequence of instructions in the code;

determine that the code accesses a secure region of a memory;

access the secure memory region only if the code is located within the secure region of the memory, and further comprising destroying at least some data upon occurrence of a specified event.

70. The medium of claim 63, wherein the computer readable representation configured to cause a processor to execute curtained code comprises a computer readable representation configured to:

fetch a sequence of instructions in the code;

determine that the code accesses a secure region of a memory;

access the secure memory region only if the code is located within the secure region of the memory;

destroy at least some data upon occurrence of an interrupt sent to a processor executing the code.

* * * * *

UNITED STATES PATENT AND TRADEMARK OFFICE
CERTIFICATE OF CORRECTION

PATENT NO. : 6,651,171 B1
DATED : November 18, 2003
INVENTOR(S) : England et al.

It is certified that error appears in the above-identified patent and that said Letters Patent is hereby corrected as shown below:

Column 6,
Line 66, replace "mechanisms" with -- mechanism --.

Column 8,
Line 16, replace "digram" with -- diagram --.

Column 19,
Line 7, replace "a" with -- A --.

Column 20,
Line 21, insert -- pointer -- between "instruction" and "for".
Line 33, replace "instructing" with -- instruction --.

Signed and Sealed this

Thirteenth Day of April, 2004

JON W. DUDAS
*Acting Director of the United States Patent and Trademark Office*